United States Patent [19]

Schlumpf

[11] 4,366,115

[45] Dec. 28, 1982

[54] STORAGE RACK FOR ASSEMBLAGES OF NUCLEAR FUEL ELEMENTS

[76] Inventor: Raymond J. Schlumpf, 18 Rue du Fort Debout, B-7630 Brunehaut-Hollain, Belgium

[21] Appl. No.: 174,618

[22] Filed: Aug. 1, 1980

[30] Foreign Application Priority Data

Aug. 7, 1979 [FR] France .............................. 79 20239

[51] Int. Cl.³ .............................................. G21C 19/00
[52] U.S. Cl. .................................. 376/272; 250/506.1
[58] Field of Search .......................... 376/272; 250/506

[56] References Cited

U.S. PATENT DOCUMENTS

| 4,006,362 | 2/1977 | Mollon . | |
|---|---|---|---|
| 4,010,375 | 3/1977 | Wachter et al. . | |
| 4,039,842 | 8/1977 | Mollon ................................. | 376/272 |
| 4,096,392 | 6/1978 | Rubinstein . | |
| 4,143,277 | 3/1979 | Krieger . | |

FOREIGN PATENT DOCUMENTS

| 2629938 | 7/1976 | Fed. Rep. of Germany . |
| 2700520 | 1/1977 | Fed. Rep. of Germany . |
| 2723849 | 5/1977 | Fed. Rep. of Germany . |
| 2742736 | of 0000 | Fed. Rep. of Germany . |
| 2836762 | 8/1978 | Fed. Rep. of Germany . |
| 2404284 | 8/1978 | France . |
| 7707041 | 6/1977 | Netherlands . |

Primary Examiner—Donald P. Walsh
Attorney, Agent, or Firm—Hammond & Littell, Weissenberger and Muserlian

[57] ABSTRACT

Storage rack for assemblages of nuclear fuel elements of polygonal or circular cross-section comprised of a plurality of storage chambers in the form of a hollow stem having a cross-section adapted to that of the assemblages to be stored, said storage chambers being side by side in a regular disposition and each separated from the other by a regular spacing, each chamber being comprised of one or more rectangular metal plates formed by bending or melted metal sealing into a hollow stem having walls disposed to form a prismatic or cylindrical surface and adapted to contain said assemblages and being supplied at the bottom with a base capable of supporting said assemblage, wherein the metal plates forming said chamber protrude outwardly from said prismatic or cylindrical surface on at least two locations of the chamber contour, forming at these locations projections on which adjacent chambers are applied and attached, the assembly of chambers being without cross-pieces or coupling or packing pieces, and forming a self-supporting structure capable of being inserted into a proper storage room for assemblages of nuclear fuel elements.

14 Claims, 14 Drawing Figures

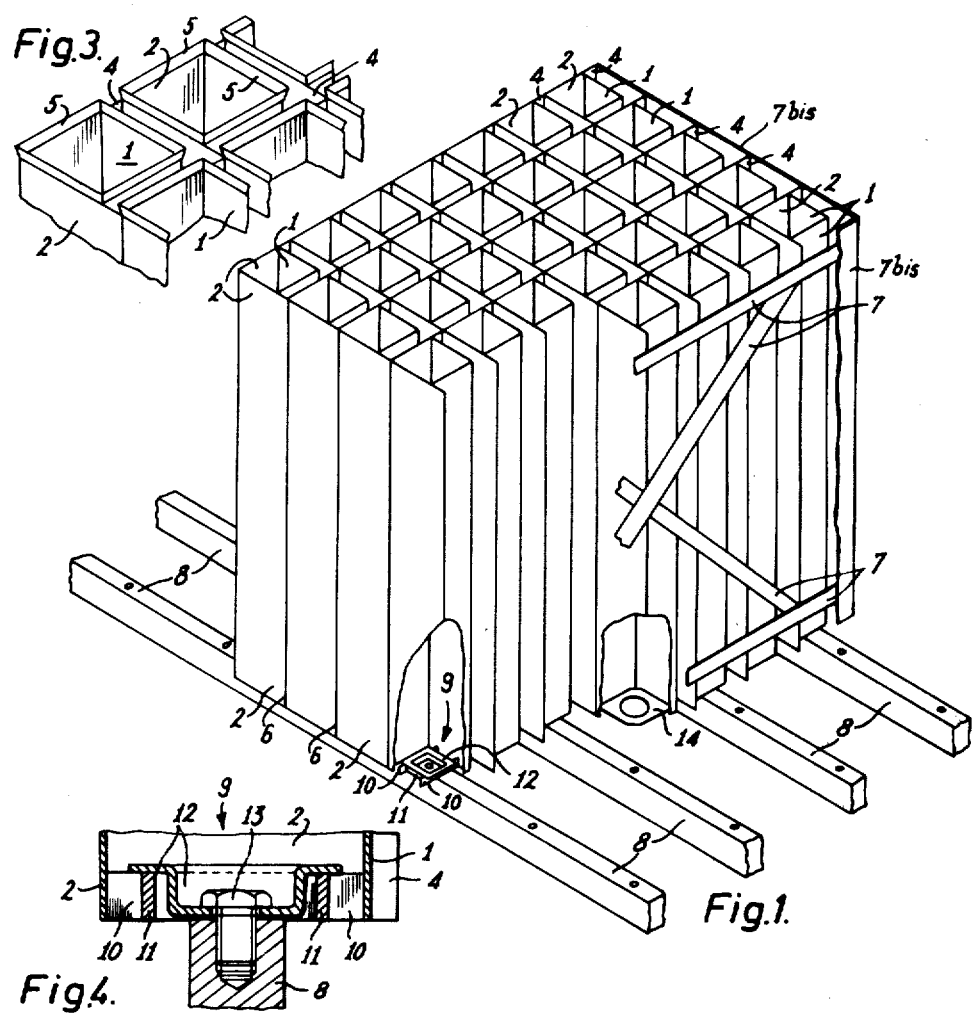
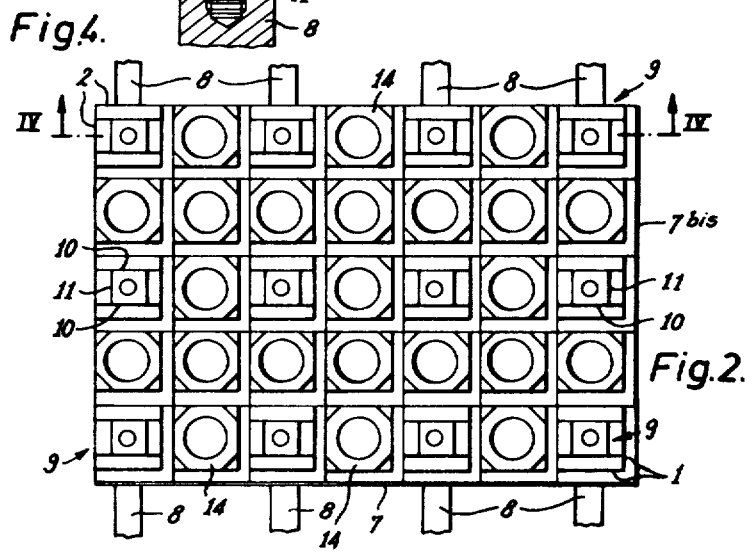
Fig.1. Fig.2. Fig.3. Fig.4.

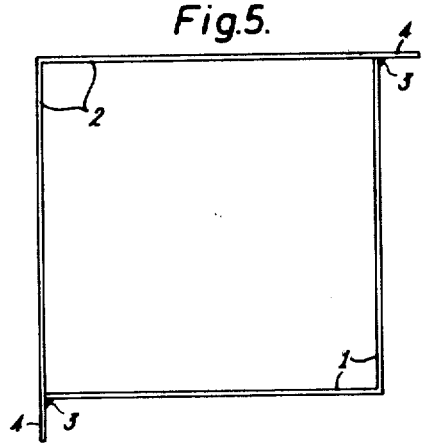
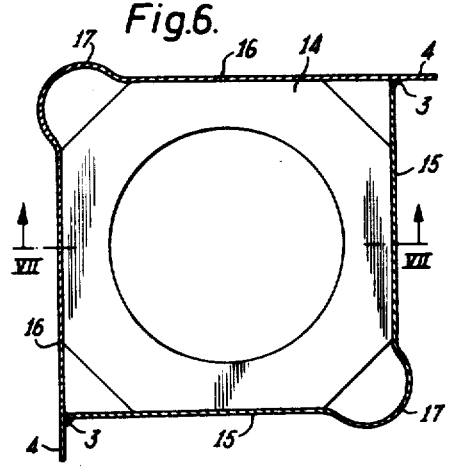
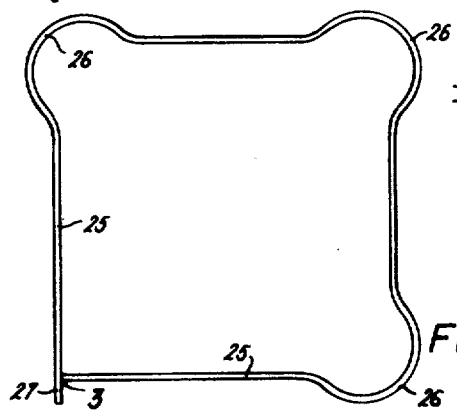
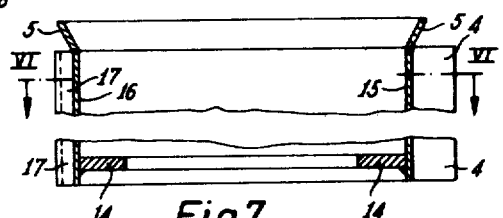
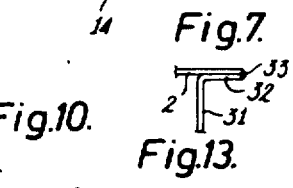
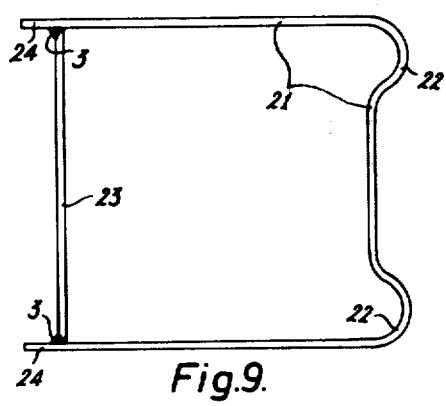
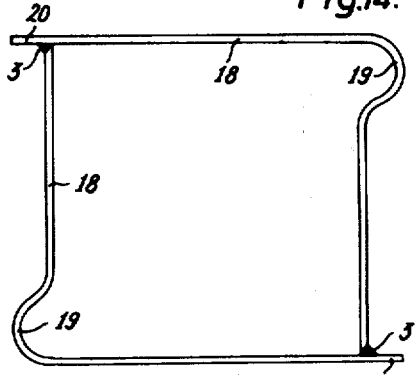

STORAGE RACK FOR ASSEMBLAGES OF NUCLEAR FUEL ELEMENTS

BACKGROUND OF THE INVENTION

The present invention concerns a storage rack for assemblages of nuclear fuel elements.

It is well known that nuclear reactors comprise assemblages of fuel elements disposed in the tank of the reactor following an appropriate configuration. These fuel elements are generally steel tubes filled with pellets of nuclear fuel materials. The fuel elements, which usually have a diameter of between 0.6 and 2 cm and a length of between 2 and 5.5 m, are grouped in "assemblages" which generally comprise at least several tens of fuel elements disposed in parallel fashion in bundles. The assemblages of fuel elements are assembled usually as prismatic structures having a square or hexagonal cross-section.

It is also known that after a certain period of functioning of the reactor, the irradiated fuel material should be withdrawn and replaced by new fuel material.

The spent fuel material is strongly radio-active and produces a considerable amount of heat. Indeed, it contains a residual quantity of initial fuel material and also numerous radio-active fission products.

It is important consequently to have a storage installation in order to store the assemblages of fuel elements which have been removed from the reactor, until they are either reutilized or sent from the nuclear center to a place of final storage or to another storage place.

Several types of storage installations have already been proposed and utilized in the past. As a general rule, such an installation consists of one or several "racks" in an adequate storage area, for example, in a pool filled with demineralized water or aqueous boric acid solution or in a storage area cooled by circulation of a gas or other appropriate fluid. The rack is composed of "chambers" each of which can receive and maintain an assemblage of fuel elements. Water plays simultaneously the roles of a cooling agent and of antiradiation shielding. The boron compounds which can be dissolved in the water of the pool, serve as "neutronic poisons" absorbing the neutrons.

Particularly a storage rack for assemblages of fuel elements (assemblages of square cross-section) is known in which each chamber is simply constituted by four angles disposed on the four corners of the chamber. All the angles which comprise the rack are held in place by being assembled to a series of traverses disposed between the chambers.

Also known is a storage rack composed of steel tubes, the cross-section of which corresponds to the form of the fuel assemblages which they must contain, said steel tubes being stayed and braced together by being fixed at their upper and lower parts to plates provided with holes of the appropriate dimensions and regularly spaced.

Other type of known storage racks are composed of steel tubes analogous to the above, cross-braced and tied to each other by being attached to metallic traverses disposed at several places between the rows of chambers.

It should be noted that in all these storage racks, the chambers are spaced from each other. It is important to take care that the fuel assemblages are separated by a sufficient distance in order to avoid a critical arrangement of nuclear fuel.

It is also true that some storage racks have been described as formed of adjacent storage chambers in checkerboard arrangement. However, in such storage installations, the spent assemblages of fuel elements can only be stored in one chamber out of two.

In fact, the storage installations for spent assemblages of fuel elements must comply with numerous very severe criteria, particularly concerning their strength and the precision of their dimensions, the security and ease of their use. These criteria imposed by the expert in the art, tend in addition to become more and more severe.

OBJECTS OF THE INVENTION

The present invention has for its object to provide a storage rack for assemblages of fuel elements which meets in an optimal manner these various criteria and which allows, in particular, to reduce the floor space of the storage installations, while avoiding the criticality of the assemblages of fuel elements.

Another object of the invention is to provide a storage rack designed in such a manner that the neutronic absorption between neighboring chambers can be easily modified as a function of the reactivity of the assemblages of fuel elements which are stored therein.

A further object of the invention is to provide a storage rack which is sufficiently robust to be resistant particularly to earthquakes, fall of airplanes, tornadoes and missiles. This rack, however, does not comprise traverses between the rows of chambers. This structure of the rack permits particularly the insertion, in a simple and efficacious manner, of neutronic shielding elements between the neighboring chambers.

Yet a further object of the invention is to provide a rack for very high density storage by constructing the walls of the chambers themselves using a material which is a good neutronic shield, such as inter alia sheets made of a steel having a quite elevated content of a neutron absorbing material (for example boron or cadmium) or sheets of steel covered with a layer of a neutron absorbing compound, for example boron carbide.

The invention thus essentially relates to the provision of a storage rack which complies simultaneously and in an optimal manner to the various objectives given above.

DESCRIPTION OF THE INVENTION

The present invention provides a storage rack for nuclear fuel assemblages of circular or polygonal cross-section, comprised of several storage chambers consisting of hollow stems having a cross-section adapted to that of the said assemblages, placed one beside the other following a regular pattern of parallel rows, a spacing being carefully maintained between the walls of the neighboring chambers, each chamber being composed of one or several rectangular metal plates bent and/or melted metal sealed in such a manner as to form a hollow stem having walls disposed to form a prismatic or cylindrical surface and being equipped at its lower part with a base capable of supporting a nuclear fuel assemblage, the metal plates which form the chambers protruding outwardly from said prismatic or cylindrical surface at at least two locations of its contour while forming at these locations projections against which the neighboring chambers are applied and attached. The chambers, joined directly together by known means, without interposition of cross-pieces or of coupling or packing pieces, form a self-supporting structure which can be disposed in a storage area for nuclear fuel assemblages.

More particularly, the said chambers are designed to contain nuclear fuel assemblages of polygonal cross-section; each chamber then consists of a hollow stem having walls disposed following the lateral faces of a prism.

One or several of the projections with which the chambers are provided can be located each along a vertical edge where two panes of metal plate which form neighboring faces of a chamber are attached by melted metal sealing, such as soldering or welding, one of these panes of metal plate forming one of the said projections by being extended, beyond the line of melted metal sealing, to abut a neighboring chamber.

One or several of the projections with which the chambers are provided can be located each at the junction of two neighboring faces of a chamber formed by two panes of metal plate attached by melted metal sealing, a first pane of metal plate being extended beyond the edge of the said prismatic surface to abut a neighboring chamber, the outer edge of the second pane of metal plate being bent towards the exterior of the chamber, thus rejoining the edge of the first pane of metal plate, the edges of the two panes of metal plate being melted metal sealed.

One or several of the projections with which the chambers are provided can also be located each at the junction of two neighboring faces of a chamber, formed by the bending of the same metal plate, the zone of junction between these two neighboring faces comprising a lobe directed towards the exterior of the chamber until contacting an adjacent chamber.

The invention is applicable inter alia to storage racks composed of chambers which are designed to contain nuclear fuel assemblages of square cross-section. In this case, each chamber consists of a hollow stem having walls disposed following the lateral faces of a right prism of square cross-section.

According to a particular embodiment of the invention, these chambers of square cross-section are composed each of two angles of metal plate, assembled together by melted metal sealing, each of these two angles having a pair of wings of equal length, one of the two angles having, however, wings which are longer than those of the other angle; these longer wings extending thus beyond the line of melted metal sealing to abut an adjacent chamber.

These chambers of square cross-section can also be composed each of two identical angles of metal plate, assembled together by melted metal sealing, these angles having each a wing which is longer than the other, these longer wings extending thus beyond the line of said melted metal sealing, to abut an adjacent chamber.

When, as described above, the chambers are composed each of two angles of metal plate (identical or dfferent), each of these angles can be obtained by bending a single rectangular metal plate to a right angle.

Each of these angles, however, can also be formed by assembling together two flat metal plates by soldering or welding. This method for forming the angle can possibly be utilized when using steel plates which cannot tolerate bending to a small radius of curvature.

Each of these angles can, however, also be formed by bending a rectangular metal plate in such a manner that the zone of junction between the two wings of the angle comprises a lobe directed outwardly.

According to a particular embodiment of the invention, each chamber of square cross-section is composed of:

(a) a profile of metal plate having a cross-section in the form of a U, forming three faces of the chamber, the zones of junction between these faces comprising a lobe directed outwardly to abut an adjacent chamber, and (b) a plane metal plate soldered or welded between the free wings of the said U-shaped profile, forming the fourth face of the chamber, each wing of the U-shaped profile being prolonged beyond the line of the soldering or welding, to abut an adjacent chamber.

These chambers of square cross-section can also be composed each of a single metal plate bent in such a manner as to form the four faces of the chamber, each zone of bending comprising a lobe directed outwardly to abut an adjacent chamber, a melted metal sealing being made at one of the vertical edges of the chamber, one of the two panes of the metal plate joined by this soldering or welding being prolonged beyond the line of melted metal sealing to abut an adjacent chamber.

Various types of steel plate can be utilized for the production of the storage racks of the invention.

One of the important advantages of the invention resides in the fact that it allows the utilization of metal plates which cannot undergo bending around a small radius of curvature. This allows, in particular, the use of steel plates having a fairly high boron content (for example, between 0.8 and 1.5%). Such metal plates are very advantageous as neutron shields.

Stainless steel plates covered with a layer of a boron compound, such as boron carbide, can also be utilized. The coating of the metal plates can be effected according to techniques known in themselves and can be carried out before or after the bending of the metal plates. When the coating of the metal plates is effected before their bending, it is generally necessary to bend the metal plates according to a quite large radius of curvature (from whence comes the necessity to form a lobe in the bending zone).

The invention allows the construction of very high density storage racks, especially when the chambers are made of boron containing steel plates or of steel plates covered with boron compounds. The present invention allows in addition the construction of storage racks in which the spacing between the chambers is yet further reduced. The structure of the storage racks of the invention allows the placing of additional neutron shielding in the spaces between the walls of the adjacent chambers. In such a manner, the criticality of the assemblages can be avoided, even if the interval between the chambers is very narrow. Various types of shielding materials, known in themselves, can be utilized in order to form the additional shield. Most of the shielding materials have a high content of boron. Boron (principally the $B^{10}$ isotope) is very interesting since it has a high neutron absorption cross-section.

In order to form an additional neutron shield between the chambers, rigid plates, such as plates of sintered boron carbide or of steel plates having a high content of boron, or of metal plates coated with boron carbide, can be used in particular. However, other known materials, particularly composite pliable sheets produced by the firing of an agglomerate of boron carbide and glass fibers, can also be used. Sheets of neoprene compounded with boron carbide, entirely cladded with stainless steel sheets are also known.

The plates or sheets constituting the additional shields can be attached by well known means in the spaces between the chambers. A very advantageous way of proceeding consists of hanging the top of these plates or sheets to the upper extremities of the projections with which the chambers are provided.

The plates or sheets which form the additional shields can be permanently attached. In general, however, it is preferable to attach the plates or sheets forming the additional shields in a detachable manner. In this way, if required, one can replace one type of shield by another, or change, as required, the disposition of the shielding plates in the rack. It should be noted that it is not always necessary to put shielding plates in all the intervals between the chambers. The number and the positioning of the shielding plates can be modified as a function of the reactivity of the stored fuel assemblages, and this reactivity depends on the type of assemblage. The detachable mounting of the shielding plates permits them to be placed selectively at the places where they are required, which is very advantageous since the shielding materials are expensive.

According to a particular and very advantageous embodiment of the invention, the plates or sheets for additional shielding are attached in a movable manner but special means are provided in order that their handling is possible only by using a tool or tool element which is owned solely by the inspection agency responsible for security.

BRIEF DESCRIPTION OF THE DRAWINGS

FIG. 1 is an isometric projection view (with pars broken away) of a storage rack according to the invention.

FIG. 2 is a plan view of the rack of FIG. 1.

FIG. 3 is a detail view, at a larger scale, showing the structure of the top part of the chambers of the storage rack shown in FIG. 1.

FIG. 4 shows, at a large scale, the structure of a base mounted in the lower part of the chamber and fixed on an anchoring beam of the rack; this construction detail is shown in vertical section along line IV—IV of FIG. 2.

FIG. 5 is a schematic plan view of a chamber of the storage rack shown in FIG. 1, this chamber being represented without the flared region which is present in the upper part and without the base which is attached to its lower part.

FIG. 6 is a horizontal section (along line VI—VI of FIG. 7) of another storage chamber according to the invention.

FIG. 7 is a vertical interrupted section (along line VII—VII of FIG. 6) of the chamber shown in FIG. 6.

FIGS. 8 to 10 show, respectively, three other forms of storage chambers according to the invention, these chambers being represented in a manner analogous to that of FIG. 5.

FIG. 13 shows a construction detail of a chamber which can be considered as a variant of that shown in FIG. 5.

FIG. 14 shows a construction detail according to a variant of the chambers shown in FIGS. 6 to 10.

On all these figures, the identical or analogous elements and parts are designated by the same reference numbers.

DETAILED DESCRIPTION

Figure 11:
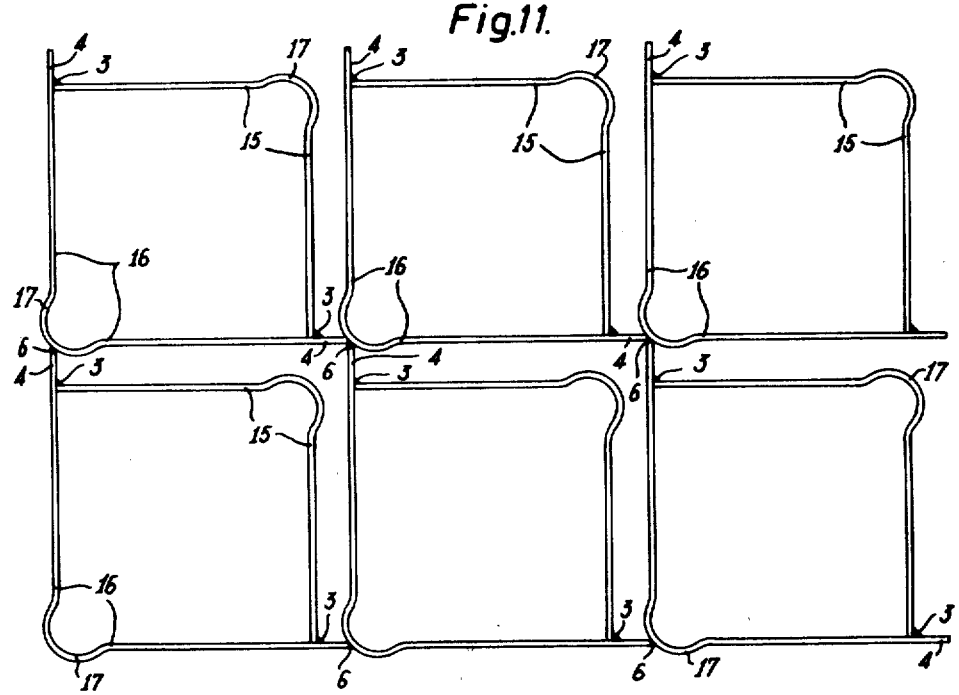
FIG. 11 is a schematic plan view showing the manner in which chambers of the type illustrated in FIG. 6 are assembled into a rack.

The storage rack shown in FIGS. 1 and 2 is composed of storage chambers for nuclear fuel assemblages of square cross-section. As shown in FIGS. 1 to 5, each of these chambers is composed of a first angle of metal plate 1 and a second angle of metal plate 2. The angles 1 and 2 each have wings of equal length, but the wings of angle 2 are longer than those of angle 1. These angles 1 and 2 are attached to each other by the soldering or welding 3 in such a manner as to form a hollow stem of square cross-section. The wings of the angle 2 protrude beyond the line of soldering or welding 3 forming thus, outside of the chamber, two projections designated by reference number 4. It is obvious that the length of the wings of angle 1 determines the length of the lateral walls of the chamber, whereas the length of the projections 4 (the difference between the length of a wing of angle 2 and the length of a wing of angle 1) determines the space between the adjacent chambers.

Each of the angles 1 and 2 is formed by bending a rectangular steel plate to a right angle. The thickness of the metal plate will be, for example, of the order of 5 millimeters. The bending of these metal plates is generally made on a very small radius of curvature (generally of the order of a few millimeters). This radius of curvature is, in fact, dependent upon the cross-section of the combustible assemblages which must be stored in the chambers. The necessity of bending the metal plates with a very small radius of curvature requires using metal plates of quite malleable steel.

As shown in FIG. 3, each chamber carries at its upper extremities a flared part 5, formed from four small strips of metal plate soldered or welded onto the upper edges of angles 1 and 2. These four small strips of metal plate, connected together by soldering or welding, are inclined, with respect to the vertical, towards the exterior of the chamber. The flared part 5 is designed to facilitate the introduction of the fuel assemblages into the chambers. For simplification, the flared part 5 is not shown in FIG. 1.

The storage rack is constructed by assembling, by solderings or weldings 6, the chambers which are disposed side by side following the same orientation in several successive rows. Each soldering or welding 6 bonds the end of a projection 4 with the edge of the angle 2 of an adjacent chamber. It should be understood that this assemblage is made chamber after chamber and row after row, in such a manner as to always have access, during the assembling, to the sides on which the soldering or welding 6 must be made.

When the complete rack is thus assembled, two of its lateral faces are formed by the wings of angles 2, soldered or welded to each other in a row.

Along the two other lateral faces of the rack, the projections 4 protrude beyond the walls of the chambers formed by the angles 1. In order to reinforce the rigidity of the rack, these projections 4 can be attached together by metallic traverses 7 or by metal plates 7 bis, to which they are soldered or welded. FIGS. 1 and 2 show these two alternative embodiments.

The storage rack rests and is anchored on anchoring beams 8 which are themselves attached to the bottom of the storage pool. It should be noted that, in the example shown in FIGS. 1 and 2, only one row of chambers out of two rows rests on an anchoring beam 8.

Each chamber is supplied at its lower extremity with a base which can support a fuel assembly. These bases are, however, of two different types.

Among the chambers which rest directly on an anchoring beam 8, some are provided with a base which allows at the same time the anchoring of the chamber on the anchoring beam 8. These bases are designated in their entirety by the reference number 9.

This base 9 comprises two steel strips 10 disposed parallel to each other and soldered or welded at their ends to the lower part of two opposite walls of the chamber. Between these steel strips 10 and perpendicualr to them, are soldered or welded two shorter steel strips 11. The two strips 10 and the two strips 11 form together a framework which serves to support an anchoring piece 12 which has the form of a flat based cup provided on its upper part with a horizontal flange directed outwardly (FIG. 4). The base of this cup rests on an anchoring beam 8 and is anchored against the latter by a large screw 13 passing through a hole at the center of the anchoring piece 12 and engaging beam 8. The flange on the upper part of the anchoring piece 12 is in contact with the upper part of the framework formed by the strips 10 and 11 without, however, putting any pressure on this framework. This mounting assures a very good anchorage of the rack on the anchoring beams 8, while allowing a slight horizontal displacement of the said framework with respect to the anchoring piece 12, thus allowing for the possibility of thermal expansion of the rack.

Some of the chambers which rest directly on the anchoring beam 8 and all the chambers which are not arranged over an anchoring beam 8 have, at their lower extremities, a base 14 which consists of a piece of thick metal plate in octagonal form having a large round hole in its center. This base 14 is soldered or welded, by four of its sides, to the walls of the chamber. The shape and position of the base 14 is shown with more detail in FIGS. 6 and 7 (which show, however, a chamber of another type than that of FIGS. 1 to 5).

The rack shown in FIGS. 1 and 2 is of very robust construction. It should be noted, however, that this rack does not have traverses between the rows of chambers. Because of this, the intervals between neighboring chambers are entirely open in an L shape. This allows the introduction of plates or sheets for additional shielding, as has been explained above. These plates or sheets for additional shielding are preferably attached to the upper part of the projections 4 which connect the chambers to each other.

A storage rack, such as that illustrated by FIGS. 1 to 5, can normally be made only by using, for the construction of the chambers, very malleable metal plates. In fact, such a rack with more brittle metal plates can also be assembled, if the angles 1 and 2 are themselves formed by soldering or welding two plane metal plates.

When it is desired to construct a rack from poorly malleable metal plates, particularly from steel plate having a high boron content, it is generally preferable to build the rack according to other embodiments of the invention, particularly those illustrated on FIGS. 6 to 12.

FIGS. 6 and 7 show a storage chamber which, in its entirety, is quite similar to the chamber shown in FIG. 5. This storage chamber (FIGS. 6 and 7) essentially consists of a hollow stem formed by the assemblage (by solderings or weldings 3) of two metal plate profiles 15 and 16. These profiles 15 and 16 are quite similar to the angles 1 and 2. Each profile 15 or 16 is formed by bending a rectangular metal plate and has two wings of equal length disposed perpendicularly to each other. However, the zone of junction between these two wings, comprises a lobe 17 directed outwardly from the chamber. This lobe form allows the bending of the metal plate along a large radius of curvature, while providing in the interior of the chamber the necessary space for the fuel assemblage to be stored. It can be considered that each lobe 17 passes around a vertical edge of the fuel assemblage.

However, the racks made of such chambers (FIGS. 6 and 7) are in every respect similar to the racks shown in FIGS. 1 to 4.

FIG. 11 shows schematically how such chambers (FIGS. 6 and 7) are assembled together to form a rack. It can be seen that this assemblage is analogous to that of the chambers (FIG. 5) which compose the rack shown in FIGS 1 and 2.

FIG. 8 shows schematically a storage chamber which consists essentially of a hollow stem formed by the assemblage (by the solderings or weldings 3) of two identical metal plate profiles 18. Each profile 18 is formed by bending a rectangular metal plate and comprises two wings of unequal length, disposed perpendicular to each other. The zone of junction between these two wings comprises a lobe 19 directed towards the exterior of the chamber. The longer wing of each profile 18 protrudes beyond the line of soldering or welding 3, forming a projection 20 on the exterior of the chamber. Chambers such as that shown in FIG. 8 can be assembled together (by soldering or welding) by placing the chambers in such a manner that each small wing of a chamber profile 18 is in front of a large wing of a chamber profile 18 of an adjacent chamber.

FIG. 9 shows schematically a storage chamber composed of:

(a) a profile 21 of a metal plate having a U-section forming three lateral faces of the chamber. The zones of junction between these faces comprise lobes 22 directed outwardly from the chamber, and (b) a plane metal plate 23 (forming the fourth face of the chamber) attached by soldering or welding 3 between the two wings of the metal plate profile 21. Each wing of profile 21 protrudes beyond the line of soldering or welding 3, forming two projections 24 on the exterior of the chamber.

Chambers such as that shown on FIG. 9 can be assembled together (by soldering or welding) by orienting the chambers in such a manner that each chamber is turned by 90° with respect to each adjacent chamber.

FIG. 10 shows schematically a chamber composed of a single metal plate 25 bent and soldered or welded in such a way as to form the four faces of the chamber. Each zone of bending includes a lobe 26 directed outwardly from the chamber. The soldering or welding 3 is made at one of the vertical edges of the chamber. One of the two panes of the metal plate attached by the line of soldering or welding 3 protrudes beyond the line of soldering or welding 3, forming a projection 27 on the exterior of the chamber.

Figure 12:
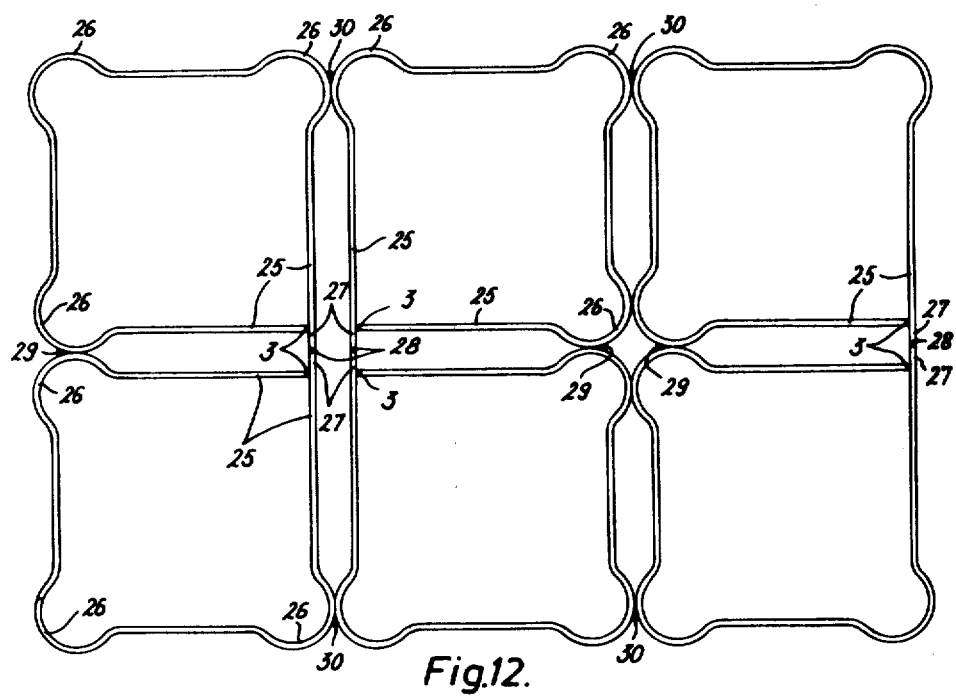
FIG. 12 shows in an analogous manner to FIG. 11 an assemblage of chambers of the type illustrated in FIG. 10.

FIG. 12 shows schematically how such chambers of FIG. 10 are assembled together into a storage rack. The chambers are first assembled by pairs, by means of solderings or weldings 28 and 29. The pairs of chambers are then assembled together by solderings or weldings 30.

FIG. 13 shows a construction detail of a storage chamber which can be considered as an alternative construction of the chamber shown in FIG. 5. According to this alternative construction, the chamber is composed of a first angle 2 (identical to the angle 2 of the chamber shown in FIG. 5) and a second angle 31, analogous to the angle 1 of the chamber shown in FIG. 5, but having a flange 32 at a right angle directed outwardly from the chamber. The end of this flange 32 abuts the end of the wing of angle 2. The two edges of metal plate are united by a soldering or welding 33. This soldering or welding 33 can simultaneously attach this projection of the chamber to an edge of the adjacent chamber.

FIG. 14 shows a construction detail of a storage chamber which can be considered an alternative construction of the chamber shown in FIG. 6. According to this alternative construction, the chamber is composed of a first profile 16 (identical to the profile 16 of the chamber shown in FIG. 6) and a second profile 34, analogous to the profile 15 of the chamber shown in FIG. 6, but having at the extremities of each of its wings a bend 35 having a large radius of curvature directed outwardly from the chamber. The extremity of each wing of the profile 34 thus abuts the extremity of a wing of the profile 16. The two edges of the metal plate are joined by soldering or welding 36. This soldering or welding 36 can simultaneously unite this projection of the chamber to the lobe 17 of the profile 16 of the adjacent chamber.

It should be understood that chambers analogous to those shown in FIGS. 8 to 10 can also be made following the alternative construction of FIG. 14.

It should be noted that FIGS. 13 and 14 are only fragmentary views (in plan) and only show the extremity of a wing of angle 31 or profile 34 attached to the extremity of a wing of the other angle 2 or profile 16.

It should be understood that the invention is not limited to the particular forms of execution which have been described above as non limitative examples and that numerous modifications can be made without departing from the framework of the invention.

It should be noted, in particular, that the metallic traverses 7 or the metal plates 7 bis which are shown in FIG. 1, are dispensible elements which can be omitted from the racks conforming to the invention.

On the other hand, the anchoring pieces 12, shown in FIGS. 1 and 4, are only indicated as an example and different systems of anchoring can also be utilized. According to a particular embodiment, the rack of the invention is not additionally anchored to the bottom of the storage pool, but rests solely on support pieces which assure a spacing between the lower part of the chambers and the bottom of the pool. In this case, lateral displacement can be prevented by methods known in themselves, for example dampers mounted between the lateral faces of the rack and the lateral walls of the pool.

It is also important to note that the invention has been described more particularly with reference to racks for the storage of fuel assemblages of square cross-section. The present invention, however, also covers storage racks for fuel assemblages having other polygonal cross-sections (for example, triangular or hexagonal). Such racks can be constructed according to the invention in an analogous manner to that described above.

I claim:

1. A storage rack for nuclear fuel assemblages of circular or polygonal cross-section, comprised of several storage chambers consisting of hollow stems having a cross-section adapted to that of the said assemblages, placed one beside the other in a regular pattern of parallel rows, a spacing being provided between the walls of the neighboring chambers, each chamber being composed of one or more rectangular metal plates formed by bending, or melted metal sealing, or both, into a hollow stem having walls disposed to form a prismatic or cylindrical surface and being equipped at its lower part with a base capable of supporting a nuclear fuel assemblage, wherein the metal plates which form the chambers protrude outwardly from said prismatic or cylindrical surface at at least two locations of its contour while forming at these locations projections against which the neighboring chambers are applied and attached, the chambers, joined directly together by known means, without interposition of cross-pieces or of coupling or packing pieces, forming a self-supporting structure in which each chamber is attached to the nearest chambers of its own row and to the neighboring rows, said structure being capable of being disposed in a storage area for nuclear fuel assemblages.

2. The storage rack of claim 1, wherein the said chambers are designed to contain nuclear fuel assemblages of polygonal cross-section, each chamber consisting then of a hollow stem having walls disposed following the lateral faces of a prism.

3. The storage rack of claim 2, wherein one or more of the projections with which the chambers are provided are located each along a vertical edge where two panes of metal plate which form neighboring faces of a chamber are attached by melted metal sealing, one of these panes of metal plate forming one of the said projections by being extended, beyond the line of melted metal sealing, to abut a neighboring chamber.

4. The storage rack of claim 2, wherein one or more of the projections with which the chambers are provided are located each at the junction of two neighboring faces of a chamber formed by two panes of metal plate attached by melted metal sealing, a first pane of metal plate being extended beyond the edge of the said prismatic surface to abut a neighboring chamber, the outer edge of the second pane of metal plate being bent towards the exterior of the chamber, thus rejoining the edge of the first pane of metal plate, the edges of the two panes of metal plate being melted metal sealed.

5. The storage rack of claim 2, wherein one or more of the projections with which the chambers are provided are located each at the junction of two neighboring faces of a chamber, formed by the bending of the same metal plate, the zone of junction between these two neighboring faces comprising a lobe directed towards the exterior of the chamber until contacting an adjacent chamber.

6. The storage rack of claim 3 or 4 or 5, wherein each chamber consists of a hollow stem having walls disposed following the lateral faces of a right prism of square cross-section.

7. The storage rack of claim 6, wherein each of these chambers of square cross-section is composed of two angles of metal plate, assembled together by melted metal sealing, each of these two angles having a pair of wings of equal length, one of the two angles having, however, wings which are longer than those of the other angle, these longer wings extending thus beyond the line of said melted metal sealing to abut an adjacent chamber.

8. The storage rack of claim 6, wherein each chamber of square cross-section is composed of two identical angles of metal plate, assembled together by melted metal sealing, these angles having each a wing which is longer than the other, these longer wings extending thus beyond the line of said melted metal sealing, to abut an adjacent chamber.

9. The storage rack of claim 7 or 8, wherein each of said angles of metal plate is formed by bending a single rectangular metal plate, where the zone of junction between the two wings of the angle comprises a lobe directed outwardly from said chamber.

10. The storage rack of claim 6, wherein each chamber of square cross-section is comprised of:
   (a) a profile of metal plate having a cross-section in the form of a U, forming three faces of said chamber, the zones of junction between these faces comprising a lobe directed outwardly from said chamber to abut an adjacent chamber, and
   (b) a plane metal plate melted metal sealed between the free wings of the said U-shaped profile, forming the fourth face of the chamber, each wing of the U-shaped profile being prolonged beyond the line of said melted metal sealing, to abut an adajcent chamber.

11. The storage rack of claim 6, wherein each chamber is comprised of a single metal plate bent to form the four faces of the chamber, each zone of bending comprising a lobe directed outwardly to abut an adjacent chamber, a melted metal sealing being made at one of the vertical edges of the chamber, one of the two panes of the metal plate joined by said melted metal sealing being prolonged beyond the line of melted metal sealing, to abut an adjacent chamber.

12. The storage rack of claim 1, wherein said rectangular metal plates of stainless steel containing boron.

13. The storage rack of claim 1, wherein said rectangular metal plates are of stainless steel coated with a layer of a neutron absorbing compound.

14. The storage rack of claim 1, wherein a neutron absorbing material is placed in at least some of the spacings which are provided between the walls of adjacent chambers.

* * * * *